(12) United States Patent
Muffoletto et al.

(10) Patent No.: US 7,072,171 B1
(45) Date of Patent: Jul. 4, 2006

(54) ELECTROLYTIC CAPACITOR CAPABLE OF INSERTION INTO THE VASCULATURE OF A PATIENT

(75) Inventors: Barry Muffoletto, Alden, NY (US); Rodney Stringham, Corfu, NY (US); Doug Eberhard, Grand Island, NY (US); Joseph Spaulding, Williamsville, NY (US); Yanming Liu, Clarence Center, NY (US); Don Monroe, Corfu, NY (US); Chris Ziarniac, Akron, NY (US); Eric Ziarniac, Alden, NY (US); Edward Gloss, Clarence, NY (US); Laurie O'Connor, East Aurora, NY (US); William Elliott, Alden, NY (US); Eric Stemen, Roseville, MN (US); Troy Lindke, Gasport, NY (US); Jason Hahl, Cheektowaga, NY (US); Keith Seitz, Niagara Falls, NY (US); Anthony Perez, Wheatfield, NY (US); Ken Talamine, Amherst, NY (US); J. Michael Druding, Orchard Park, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 0 days.

(21) Appl. No.: 11/307,564

(22) Filed: Feb. 13, 2006

(51) Int. Cl.
*H01G 9/04* (2006.01)
*H01G 9/145* (2006.01)
*H01G 9/10* (2006.01)

(52) U.S. Cl. .................. 361/508; 361/519; 29/25.03

(58) Field of Classification Search ................ 361/503, 361/508–510, 532, 516–517, 528–529, 518–523, 361/535–541; 29/25.03
See application file for complete search history.

(56) References Cited

U.S. PATENT DOCUMENTS

| | | | | |
|---|---|---|---|---|
| 2,885,607 | A | * | 5/1959 | Bugel .......................... 361/509 |
| 2,910,633 | A | * | 10/1959 | Hovey, Jr. .................. 361/503 |
| 3,634,736 | A | | 1/1972 | Boos et al. |
| 3,648,126 | A | | 3/1972 | Boos et al. |
| 4,363,078 | A | | 12/1982 | Dwyer |
| 4,538,212 | A | * | 8/1985 | Montgomery ................ 361/536 |
| 4,942,500 | A | * | 7/1990 | Libby et al. ................. 361/516 |
| 5,146,391 | A | | 9/1992 | MacFarlane et al. |
| 5,245,514 | A | | 9/1993 | Fife et al. |
| 5,822,177 | A | | 10/1998 | Popp et al. |
| 6,388,866 | B1 | | 5/2002 | Rorvick et al. |
| 6,535,374 | B1 | | 3/2003 | O'Phelan et al. |
| 6,648,928 | B1 | | 11/2003 | Nielsen et al. |
| 6,839,224 | B1 | | 1/2005 | O'Phelan et al. |
| 2004/0249417 | A1 | | 12/2004 | Ransbury et al. |

\* cited by examiner

*Primary Examiner*—Eric W. Thomas
(74) *Attorney, Agent, or Firm*—Michael F. Scalise

(57) ABSTRACT

A capacitor having a cylindrical shape or configuration so that it is capable of being inserted directly into the vasculature of a patient is described. A typical diameter for the present capacitor is about 6 mm. A capacitor of this size would occupy about 9% of the total cross-sectional area of the inferior vena cava prior to the crossover to the heart, where the typical diameter of the vein is about 20 mm. The crossover section has a diameter of about 11 mm to about 12 mm.

26 Claims, 16 Drawing Sheets

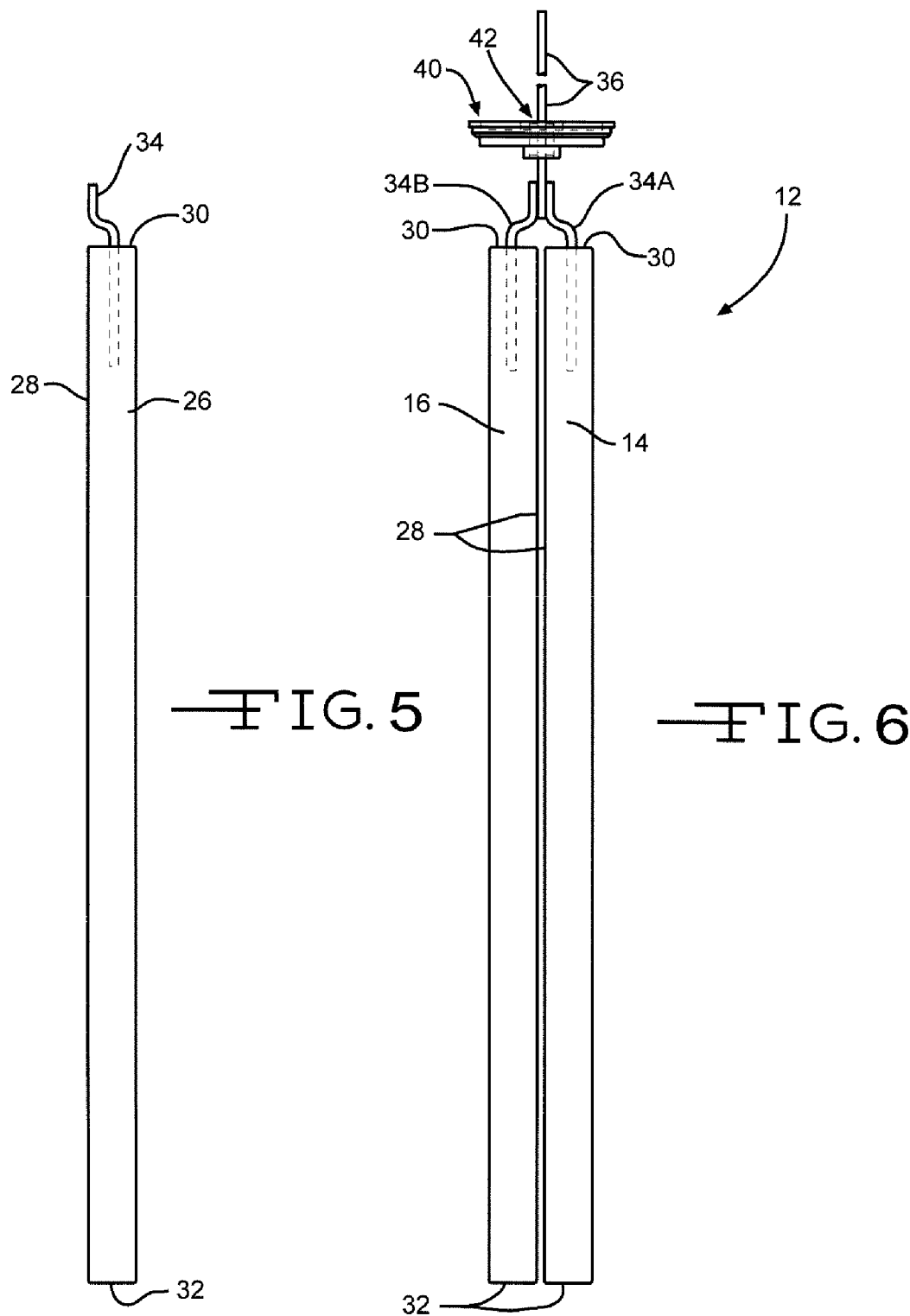

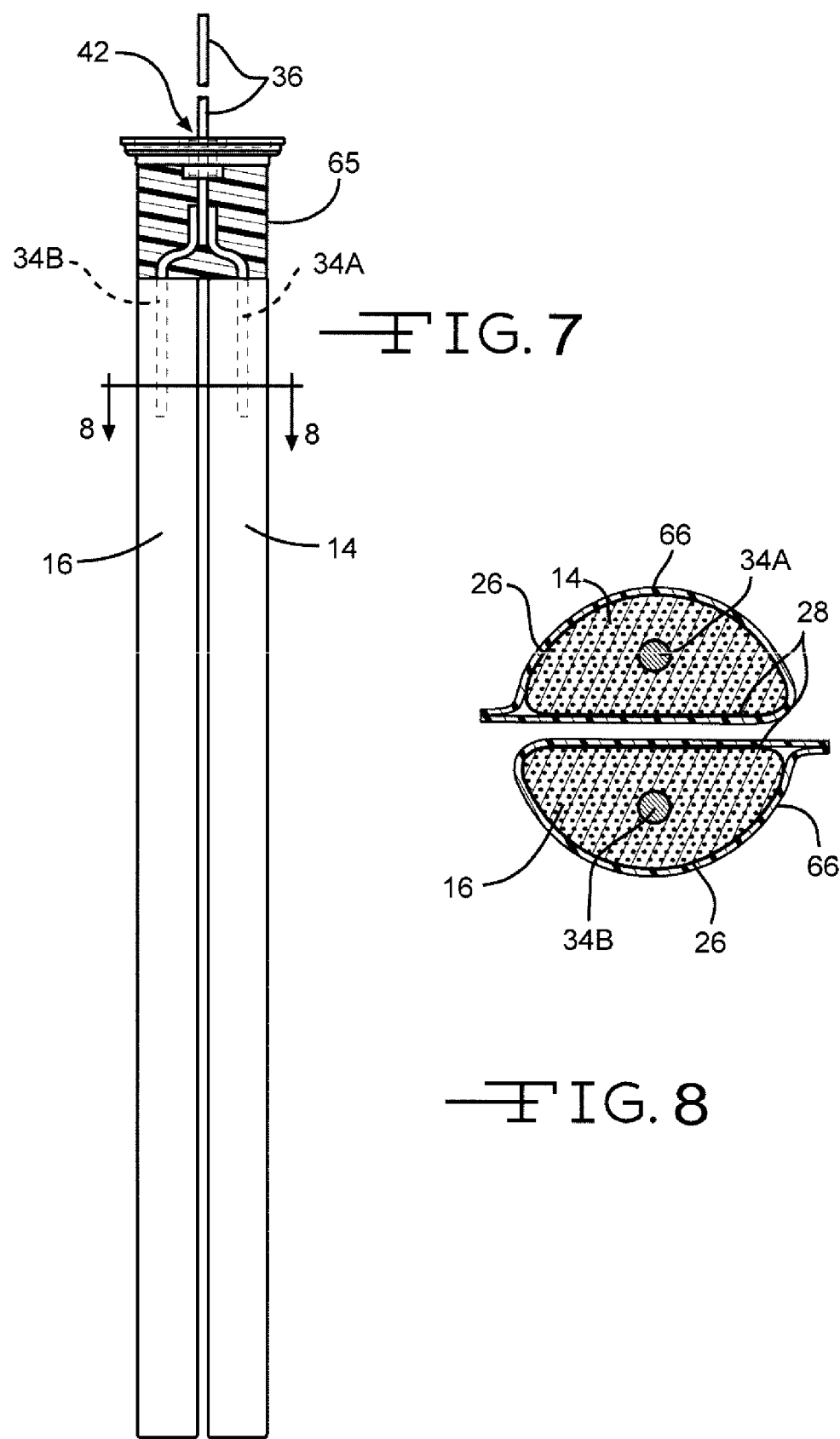

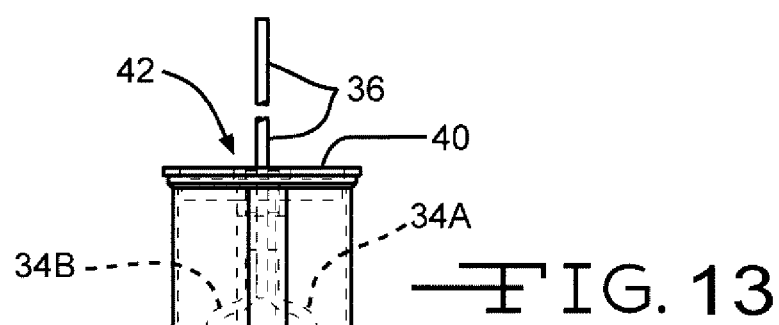
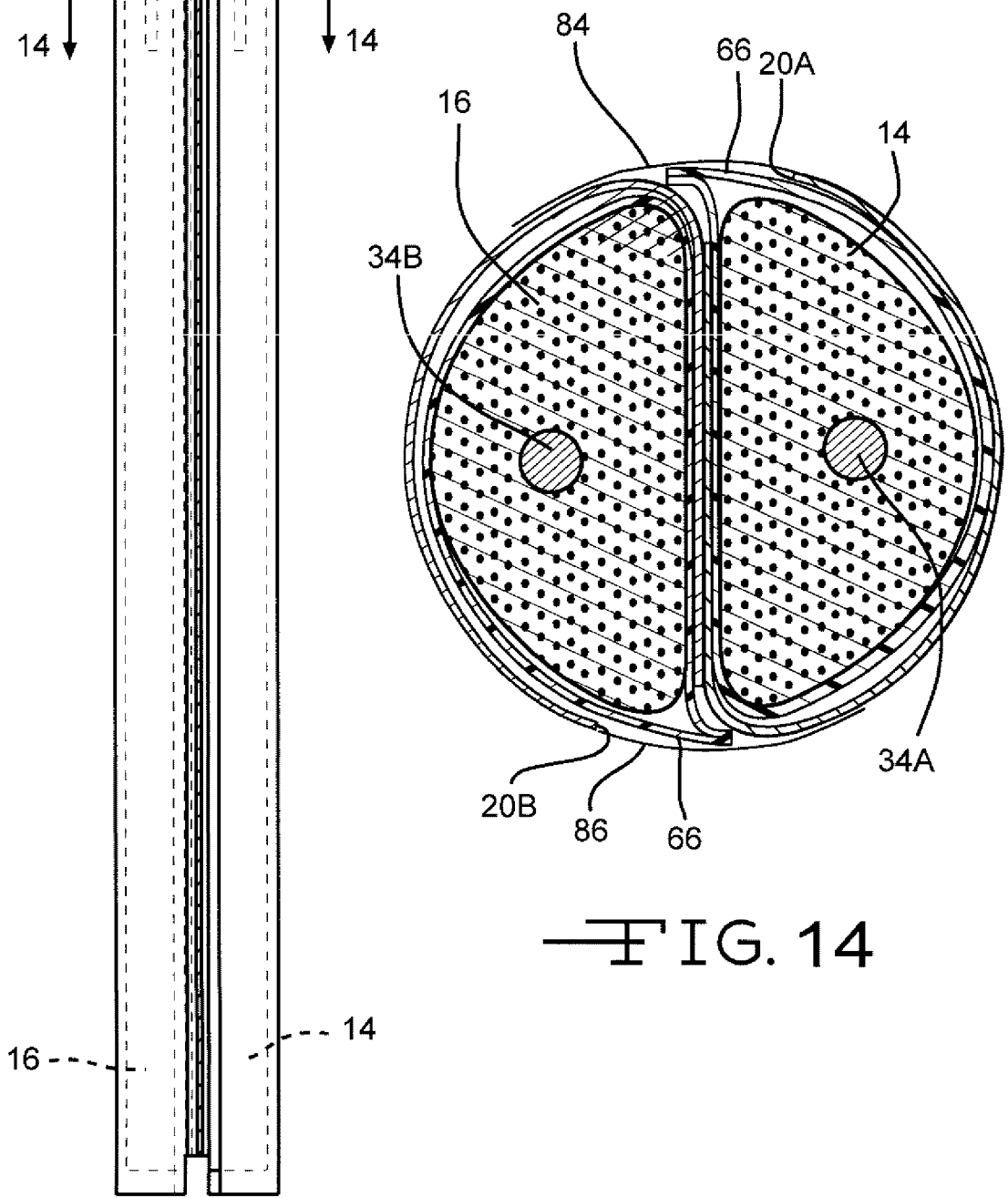

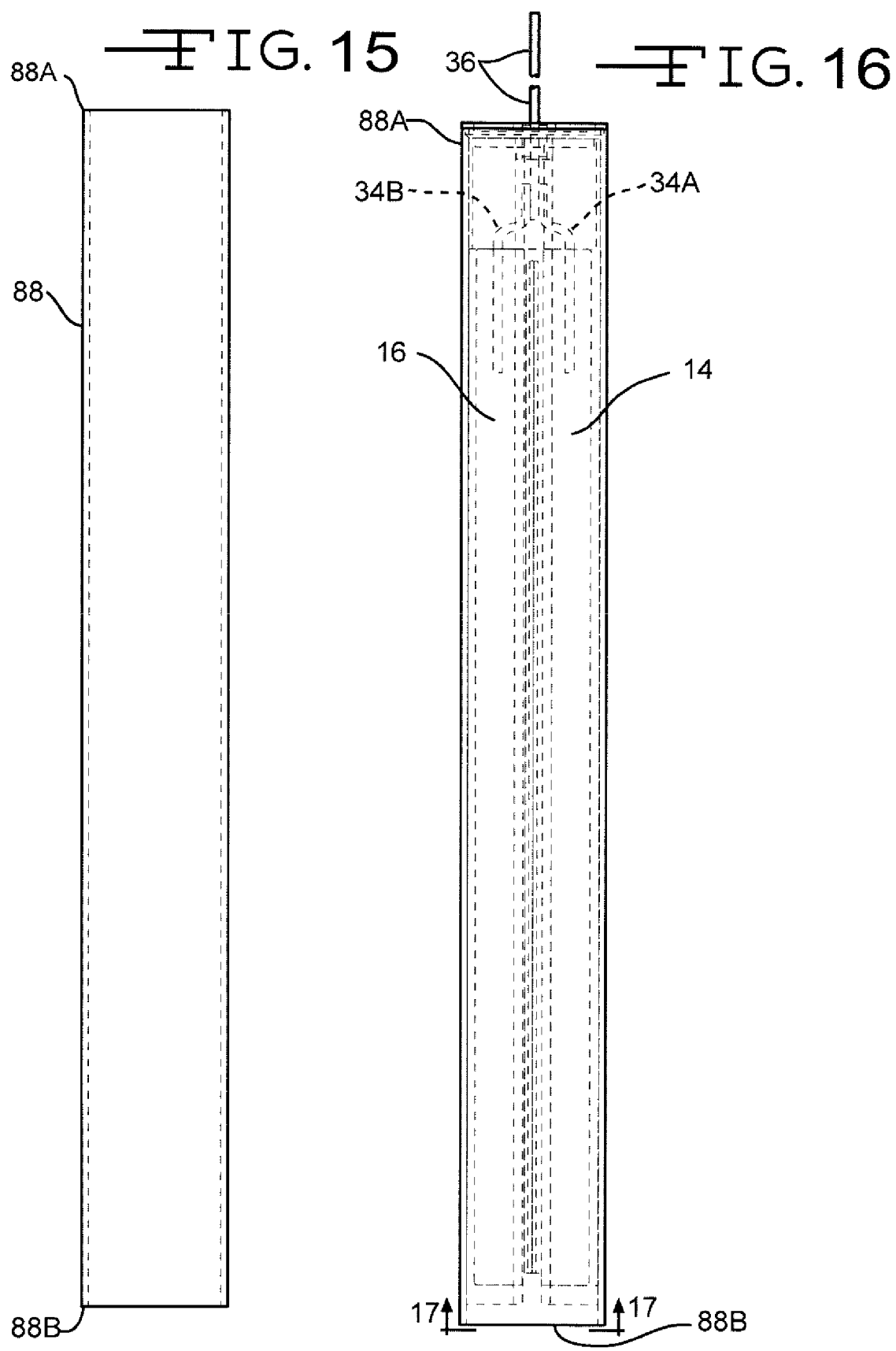

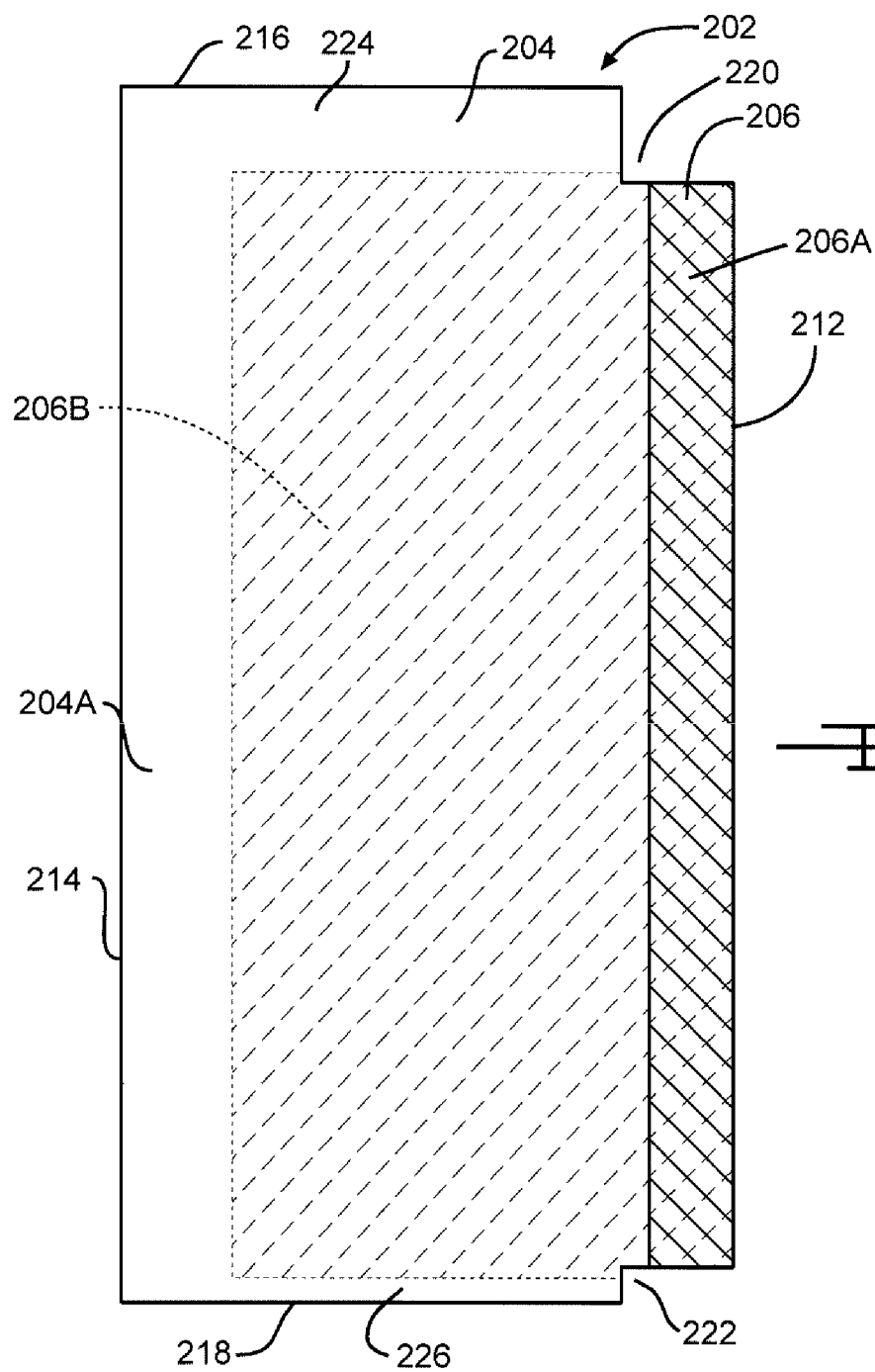
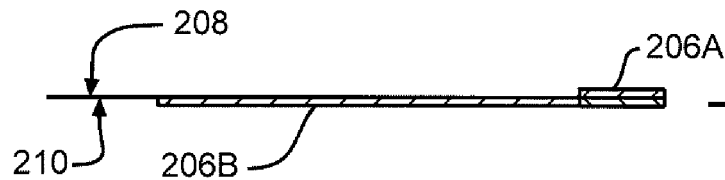

ELECTROLYTIC CAPACITOR CAPABLE OF INSERTION INTO THE VASCULATURE OF A PATIENT

BACKGROUND OF THE INVENTION

The present invention generally relates to a capacitor and, more particularly, to a cylindrical capacitor. The benefit of a cylindrical configuration means that the capacitor is capable of being inserted into the vasculature of a patient.

SUMMARY OF THE INVENTION

The present invention is directed to a capacitor having a cylindrical shape or configuration. This means that the capacitor is capable of being inserted into the vasculature. A typical diameter for the present capacitor is about 6 mm. A capacitor of this size would occupy about 9% of the total cross-sectional area of the inferior vena cava prior to the crossover to the heart, where the typical diameter of the vein is of about 20 mm. The crossover section has a diameter of about 11 mm to about 12 mm. In that respect, new and innovated methods and techniques for treating abnormal heart function are proposing that a cylindrically shaped capacitor or string of capacitors can be positioned in a patient's vasculature, particularly the inferior vena cava, for the treatment of tachyarythmias.

These and other aspects of the present invention will become more apparent to those skilled in the art by reference to the following description and to the appended drawings.

BRIEF DESCRIPTION OF THE DRAWINGS

FIG. 5 is a side elevational view showing an anode pellet including an anode wire 34 extending there from.

FIG. 6 is a side elevational view showing two anode pellets 14 and 16 as in FIG. 5 aligned in a side-by-side relationship and having their anode wires 34A, 34B connected to the terminal pin 36 supported in the glass-to-metal seal 42 of the header 40.

FIG. 7 is a side elevational view showing the side-by-side anode pellets 14, 16 of FIG. 6 having their anode wires 34A, 34B connected to the terminal pin 36 and encased in a polymeric material 65.

FIG. 8 is a cross-sectional view along 8—8 of FIG. 7.

FIG. 13 is a side elevational view of the electrode assembly for the capacitor including the side-by-side anode pellets 14, 16 and the cathode 18 fitted to the header 40.

FIG. 14 is a cross-sectional view along line 14—14 of FIG. 13.

FIG. 15 is a side elevational view of a casing tube 92 for the capacitor.

FIG. 16 is a side elevational view, partly in phantom, showing the electrode assembly housed inside the casing tube 92.

FIG. 22 is a plan view of an alternate embodiment of a cathode 18A for the capacitor.

FIG. 23 is an upper end elevational view of the cathode 18A of FIG. 22.

DETAILED DESCRIPTION OF THE PREFERRED EMBODIMENTS

Figure 1:
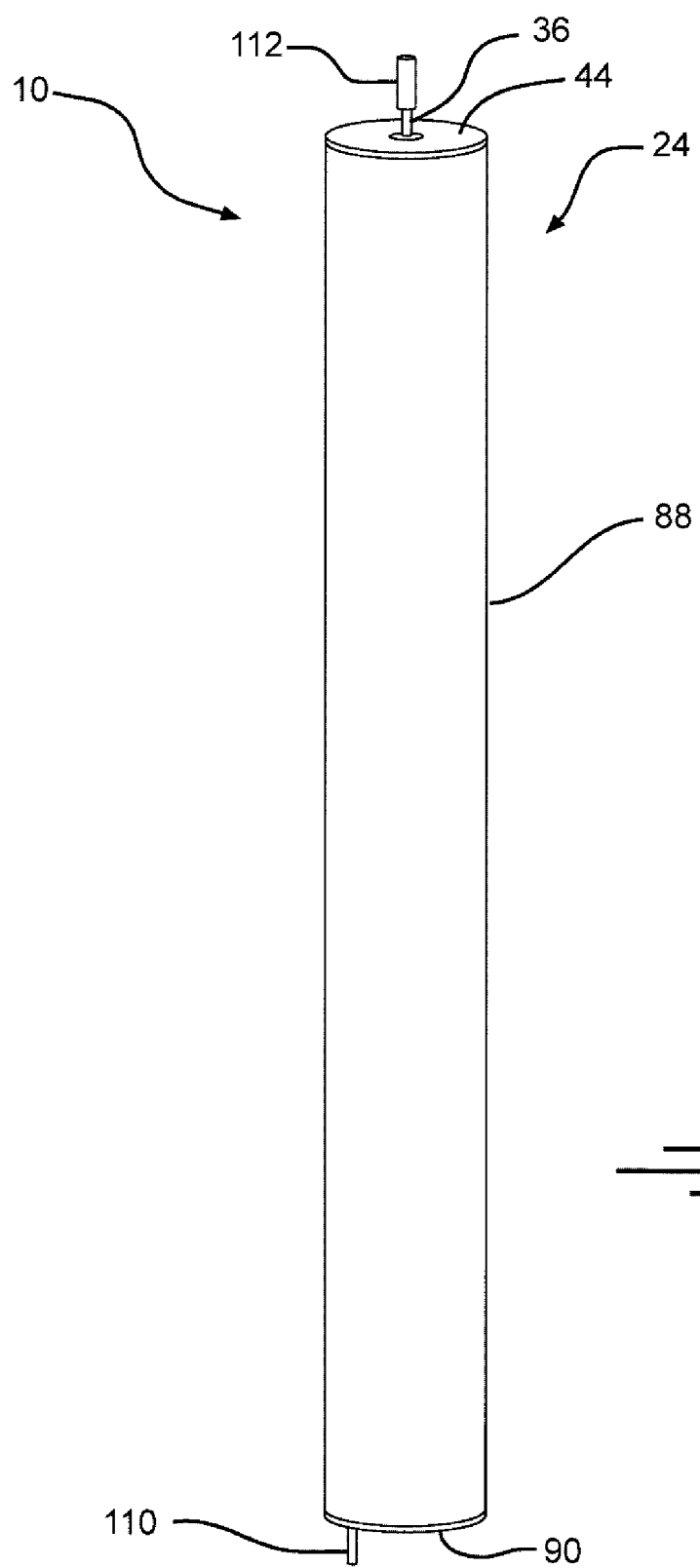
FIG. 1 is an isometric view of a capacitor 10 according to the present invention.

Referring to the drawings, FIG. 1 shows a capacitor 10 particularly constructed for insertion into the vasculature of a patient. The capacitor 10 has an outside diameter of about 6 mm. This makes it well suited for positioning in the inferior vena cava without unduly obstructing blood flow there through.

The capacitor 10 comprises an anode assembly 12 of two side-by-side anode pellets 14 and 16 (FIGS. 6 to 8), each of an anode active material, and a cathode 18 (FIGS. 9 to 12) of a cathode active material 20 supported on a conductive substrate 22. The anode assembly 12 and cathode 18 are hermetically sealed inside a casing 24 and operatively associated with each other by a working electrolyte (not shown) contained inside the casing, as will be described in detail hereinafter. The capacitor 10 is of an electrolytic type with the cathode 18 comprising the conductive substrate 22 supporting the active material 20 having capacitive properties.

Each of the anode pellets 14 and 16 is of a powdered metal selected from the group consisting of tantalum, aluminum, titanium, niobium, zirconium, hafnium, tungsten, molybdenum, vanadium, silicon, germanium, and mixtures thereof in the form of a pellet. The preferred metal is tantalum powder compressed into a shaped structure having a semi-circular or curved sidewall 26 meeting a planar sidewall 28. The sidewalls 26 and 28 extend to opposed planar end walls 30 and 32 disposed normal to the longitudinal axis of the anode pellets. Embedded anode wires 34A and 34B extend from the respective end walls 30. The anode wires 34A, 34B preferably comprise the same material as the anode active material and are bent so that their distal ends are aligned adjacent to the plane of sidewalls 28 (FIG. 7).

The anode pellets 14, 16 are sintered under a vacuum at high temperatures and then anodized in a suitable electrolyte. The anodizing electrolyte fills the pores of the pressed powder bodies and a continuous dielectric oxide is formed thereon. In that manner, the anode pellets 14, 16 and their extending wires 34A, 34B are provided with a dielectric oxide layer formed to a desired working voltage. The anodes can also be of an etched aluminum, niobium, or titanium foil.

After anodizing to the desired formation voltage, the anodes 14, 16 and extending wires 34A, 34B are aligned in the side-by-side relationship shown in FIGS. 6 to 8 with their respective planar sidewalls 28 facing each other. The distal ends of the anode wires 34A, 34B are now spaced from each other by a relatively small gap. The dielectric oxide is then removed from the distal ends of the anode wires 34A, 34B and there they are connected to an anode lead 36 supported in a header 40 by an insulative glass-to-metal seal 42 (GTMS).

Figure 2:
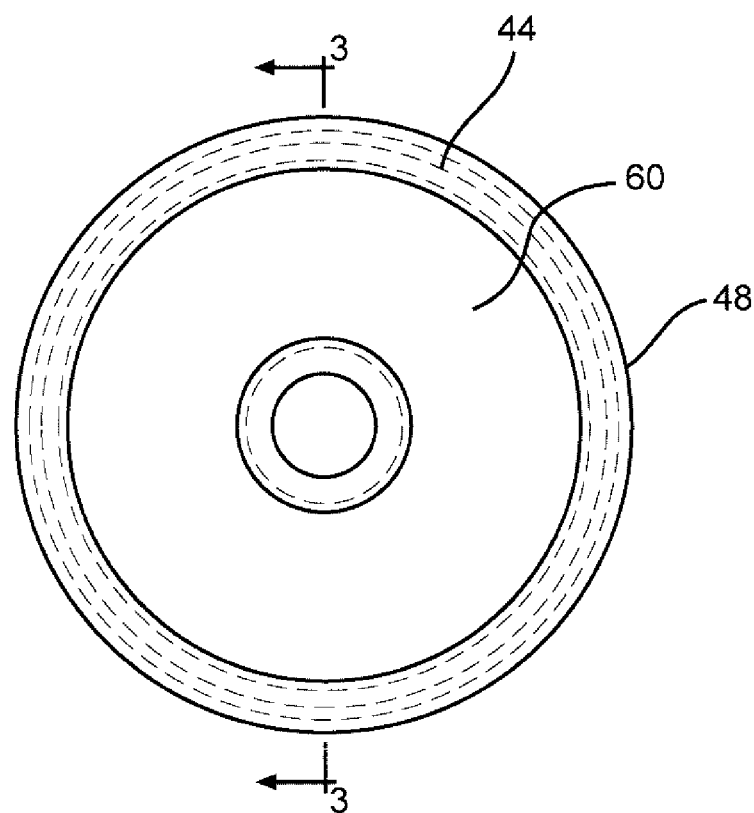
FIG. 2 is a plan view of a header 40 for the capacitor.
Figure 3:
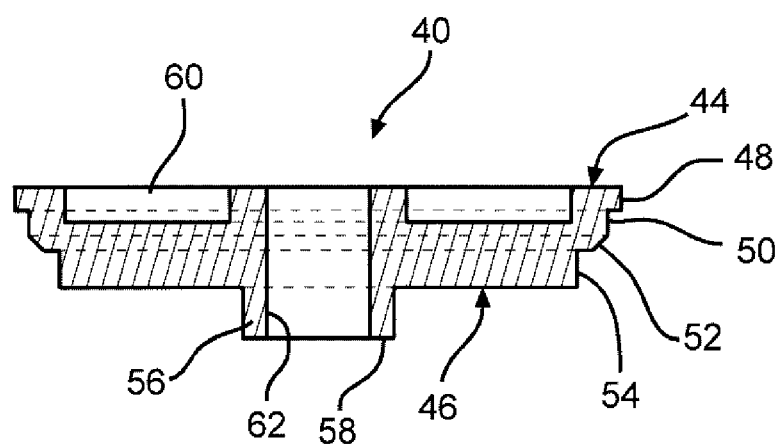
FIG. 3 is a cross-sectional view along 3—3 of FIG. 2.
Figure 4:
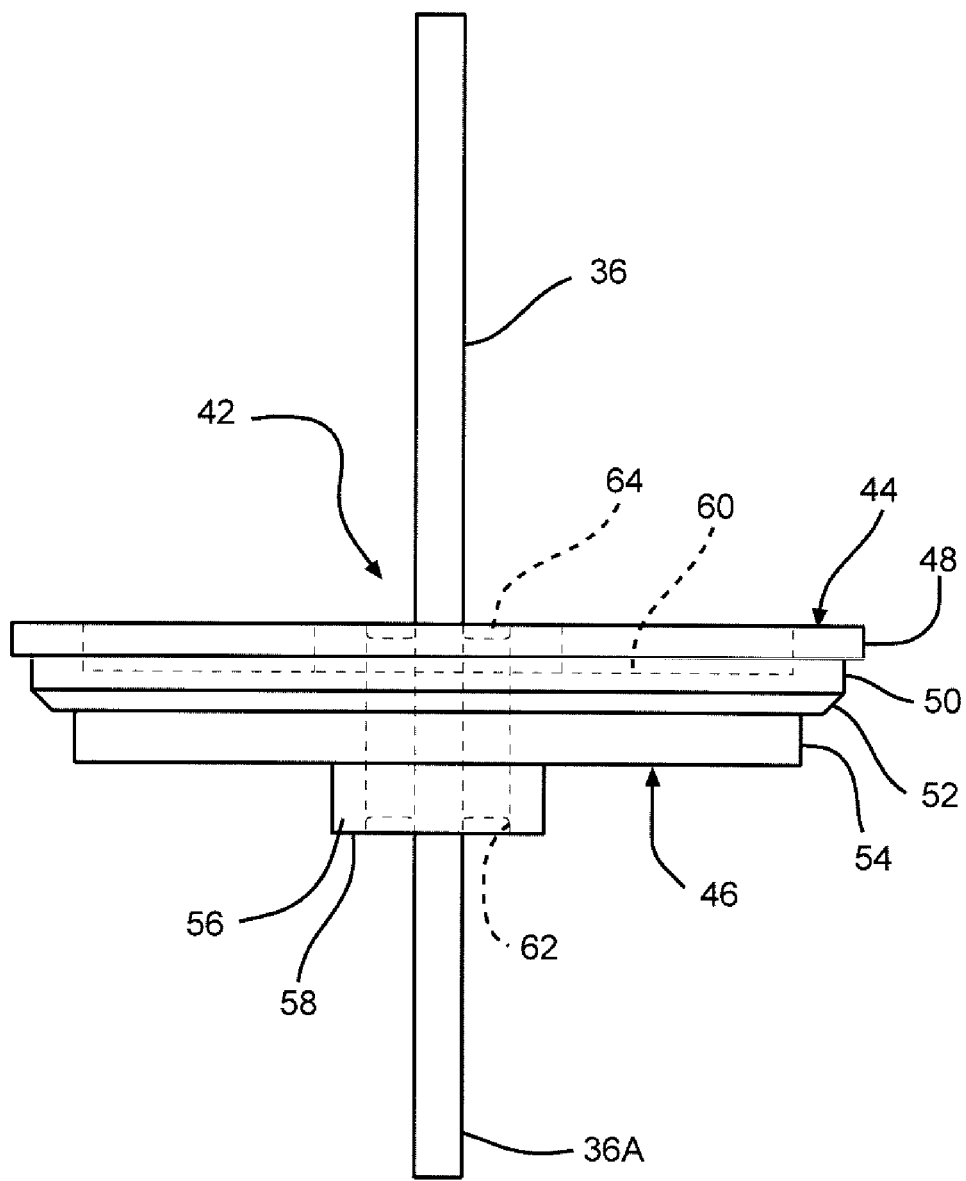
FIG. 4 is a side elevational view, partly broken away, showing the header 40 of FIGS. 2 and 3 supporting a terminal pin 36 in a glass-to-metal seal 42.

The header 40 is illustrated in FIGS. 2 to 4 as a unitary metal member such as of titanium having a cylindrical shape in cross-section and comprising an upper planar surface 44 spaced from a lower planar surface 46. Between the planar surfaces 44, 46, the header 40 has an outer diameter 48 leading to a step 50 that joins to a frusto-conical portion 52 that steps down to an inner diameter portion 54. A ferrule 56 for the GTMS is integral with the header and has a cylindrical sidewall spaced inwardly from the inner diameter portion 54 and comprising a lower side 58 spaced below the lower header surface 46. An annular channel 60 recessed into the header upper surface 44 surrounds the upper end of the ferrule 56, which is co-planar with the upper header surface 44.

The GTMS 42 comprises the ferrule 56 defining an internal cylindrical through bore or passage 62 of constant inside diameter. An insulative glass 64 (shown in phantom in FIG. 6) provides a hermetic seal between the bore 62 and the anode lead 36 passing there through. The anode lead 36 is a cylindrically shaped pin having a proximal portion 36A that is sandwiched between the spaced apart distal ends of the anode wires 34A, 34B extending from the anode pellets 14, 16. The anode lead 36 is connected to the anode wires 34A, 34B such as by laser welding. The glass 64 is, for example, ELAN® type 88 or MANSOL™ type 88. To provide support against shock and vibration conditions, a relatively fast curing polymeric material 65 such as a polyolefin, a fluoropolymer, a hot melt adhesive, or a UV curable adhesive is filled into the space between the opposed planar end walls 30 of the anode pellets 14, 16 and the lower surface 46 to the edge forming the inner diameter portion 54 of the header. A relatively slow curing silastic material is also useful. In the final capacitor assembly, the GTMS 42 electrically insulates the anode lead 36 connected to the anode wires 34A, 34B from the metal header 40, which comprises part of the casing 24.

A separator 66 of electrically insulative material in the shape of a bag completely surrounds and envelops each anode pellet 14, 16 except their respective extending wires 34A, 34B. The separator 66 prevents an internal electrical short circuit between the anode pellets 14, 16 of the anode assembly 12 and cathode active materials 20 in the assembled capacitor and has a degree of porosity sufficient to allow flow there through of the working electrolyte during the electrochemical reaction of the capacitor 10. Illustrative separator materials include woven and non-woven fabrics of polyolefinic fibers including polypropylene and polyethylene or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polyethylene membrane commercially available under the designation SOLUPOR® (DMS Solutech), a polytetrafluoroethylene membrane commercially available under the designations EXCELLERATOR™ (W.R. Gore), ZITEX® (Chemplast Inc.), a polypropylene membrane commercially available under the designation CELGARD® (Celanese Plastic Company, Inc.), and a membrane commercially available under the designation DEXIGLAS® (C.H. Dexter, Div., Dexter Corp.). Cellulose based separators also typically used in capacitors are contemplated by the scope of the present invention. Depending on the electrolyte used, the separator can be treated to improve its wettability, as is well known by those skilled in the art.

Figure 9:
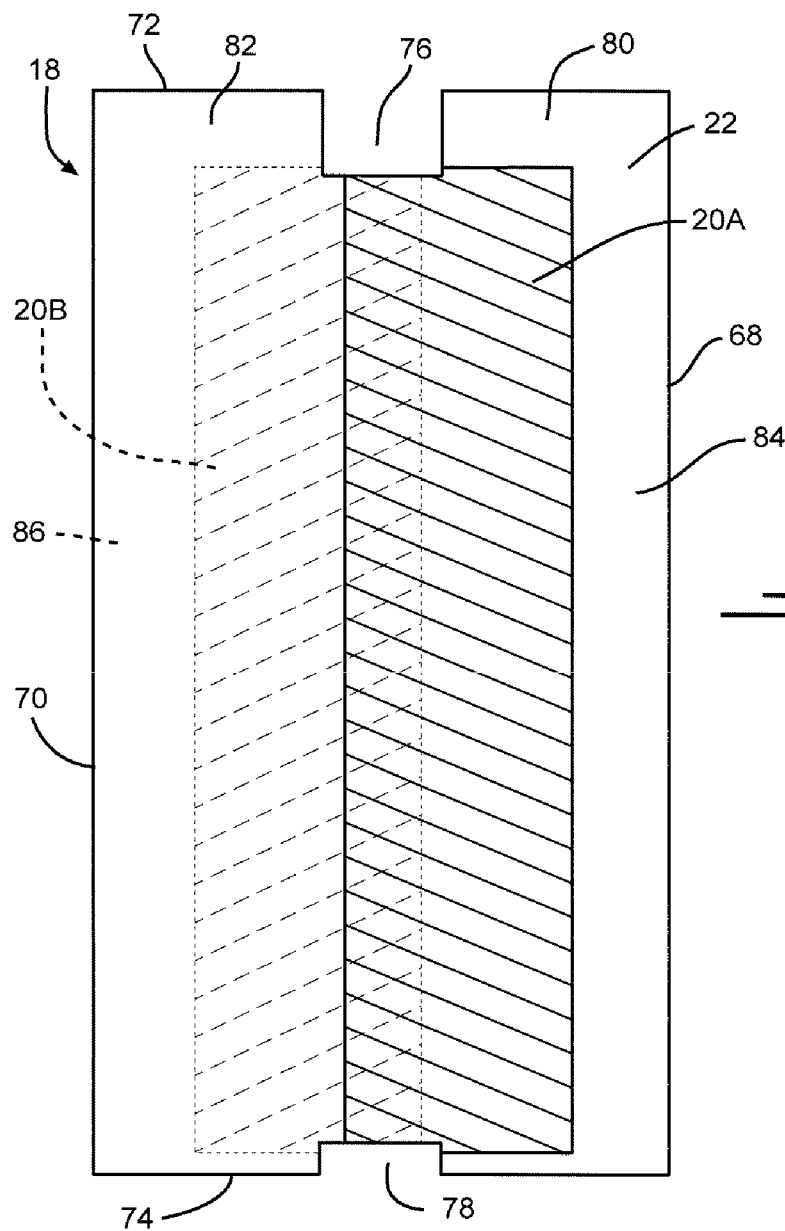
FIG. 9 is a plan view of a cathode 18 for the capacitor.

As particularly shown in FIG. 9, the cathode 18 comprises the conductive substrate 22 coated with the cathode active material 20 in selected locations. The substrate 22 is of a material selected from titanium, tantalum, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof. Preferably, the substrate is of titanium and is from about 0.0005 inches to about 0.02 inches thick, preferably about 0.001 inches thick.

The cathode active material 20 has a thickness of about a few hundred Angstroms to about 0.1 millimeters directly coated on the conductive substrate 22. In that respect, the conductive substrate 22 may be of an anodized-etched conductive material, have a sintered active material with or without oxide contacted thereto, be contacted with a double layer capacitive material, for example a finely divided carbonaceous material such as activated graphite or activated carbon black, a redox, pseudocapacitive or an under potential material, or be an electroactive conducting polymer such as polyaniline, polypyrole, polythiophene, polyacetylene, and mixtures thereof.

According to one preferred aspect of the present invention, the redox or cathode active material 20 includes an oxide of a metal, the nitride of the metal, the carbon nitride of the metal, and/or the carbide of the metal, the oxide, nitride, carbon nitride and carbide having pseudocapacitive properties. The metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead gold, silver, cobalt, and mixtures thereof. The cathode active material 20 can also be an activated carbonaceous material such as carbon nanotubes or amorphous carbon.

The substrate 22 comprises opposed major surfaces 22A and 22B extending to spaced apart right and left edges 68 and 70 meeting with an upper edge 72 and a lower edge 74. An upper inlet 76 is provided in the upper edge 72 between the right and left edges 68, 70 while a lower inlet 78 is provided in the lower edge 74 centered between the right and left edges. The upper inlet 76 is somewhat deeper than the lower inlet 78. This provides tabs 80, 82 that are used to connect the cathode to the casing serving as the negative terminal, as will be described in detail hereinafter.

The cathode active material 20 coats or contacts the conductive substrate 22 at selected locations. As particularly shown in FIGS. 9 and 10, a first section 20A of cathode active material is contacted to the first major surface 22A of the substrate in a generally rectangular pattern in plan view spaced inwardly a short distance from the left edge of the upper and lower inlets 76, 78 and extending toward the right substrate edge 68. The first cathode active section 20A has upper and lower edges that are parallel to the upper and lower substrate edges 72, 74 and spaced there from. In addition to tab 80, this configuration forms a right uncoated portion 84 extending from the right active material edge to the substrate edge 68.

Figure 10:
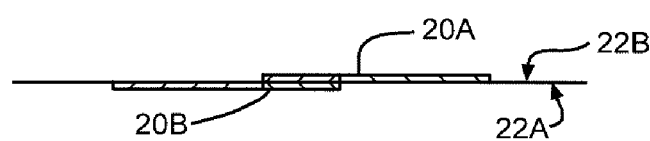
FIG. 10 is an upper end elevational view of the cathode 18 of FIG. 9.
Figure 11:
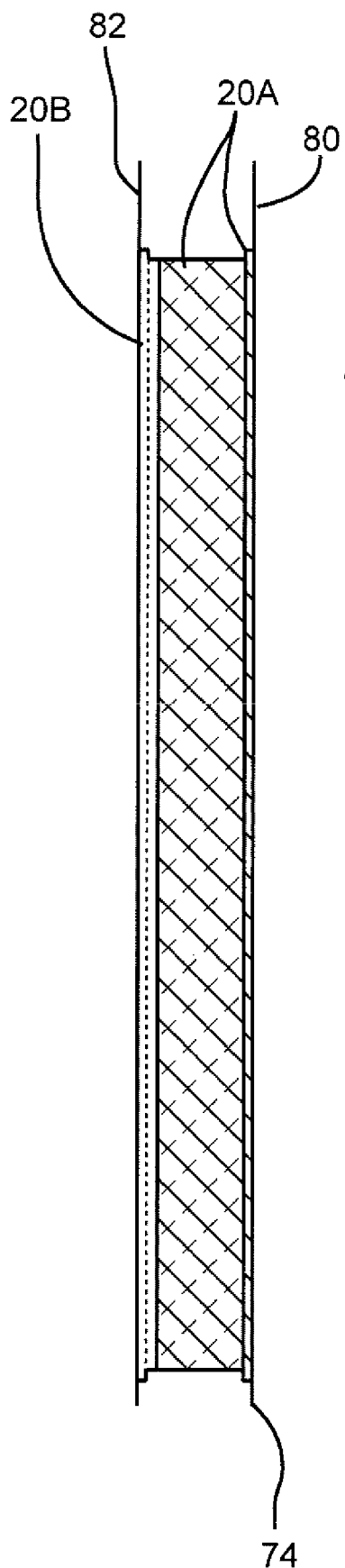
FIG. 11 is a side elevational view of the cathode 18 partially folded into its final shape.

A second section 20B of cathode active material is contacted to the second major substrate surface 22B in a generally rectangular pattern in plan view spaced inwardly a short distance from the right edge of the upper and lower inlets 76, 78 and extending toward the left substrate edge 70. The second cathode active section 20B has upper and lower edges that are parallel to the upper and lower substrate edges 72, 74 and spaced there from. In addition to tab 82, this configuration forms a left uncoated portion 86 extending from the left active material edge to the substrate edge 70. As shown in FIG. 10, this provides the first and second cathode active sections 20A, 20B having portions aligned in an overlaying relationship with each other on the respective major substrate surfaces 22A and 22B extending from the lower edge of the upper inlet 76 to the upper edge of the lower inlet 78.

The pad printing process described in U.S. patent application Ser. No. 10/920,942, filed Aug. 18, 2004, is preferred for making such coatings. Ultrasonically generated aerosol as described in U.S. Pat. Nos. 5,894,403; 5,920,455; 6,224,985; and 6,468,605, all to Shah et al., are also suitable deposition methods. These patents and patent application are assigned to the assignee of the present invention and incorporated herein by reference.

Figure 12:
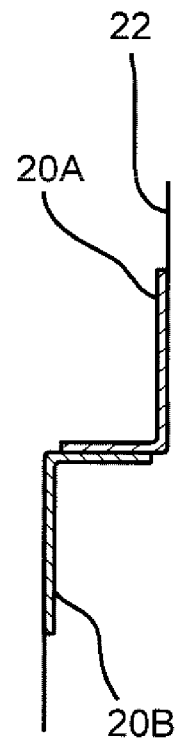
FIG. 12 is an end elevational view of the partially folded cathode of FIG. 11.

To assemble the anode assembly 12 with the cathode 18, the conductive substrate 22 is folded along the aligned left and right edges of the respective tabs 80 and 82, and into a generally Z-shaped configuration (FIG. 12). Preferably, a very small gap (not shown) is left in the respective coated sections 20A, 20B along the fold lines. This prevents the cathode active material from flaking or sloughing off of the conductive substrate as it is folded. The aligned portions of active sections 20A and 20B are next aligned with the gap between the distal end walls 32 of the anode pellets 14, 16. The substrate 22 is then moved along this gap until the upper edge of the cathode active material adjacent to the inlet 76 is aligned with the upper end walls 30 of the anode pellets.

The right and left uncoated substrate sections 84, 86 are now bent into a curved shape mirroring that of the semi-circular sidewalls 26 of the anode pellets 14, 16. The uncoated sections 84, 86 are of a length that is sufficient to overlap a portion of the substrate to form a closed, surrounding construction. In particular, the end of the uncoated section 84 overlaps the substrate opposite the side supporting the second coated section 20B while the uncoated section 86 overlaps the substrate opposite the side having the first coated section 20A. As shown in FIG. 14, the first cathode active material section 20A "covers" in an opposing manner the semi-circular sidewall 26 and the planar sidewall 28 of anode pellet 14 while the second cathode active material section 20B covers the semi-circular sidewall 26 and the planar sidewall 28 of anode pellet 16. The intermediate separator 66 prevents direct physical contact between the cathode active material sections and the anode pellets. The tabs 80 and 82 abut against the inner step 54 of the header 40 below the frusto-conical section 52, and are secured in place by laser welding. The lower edge of the cathode active material adjacent to the lower substrate edge 74 is now aligned with the lower end walls 32 of the anode pellets.

Figure 17:
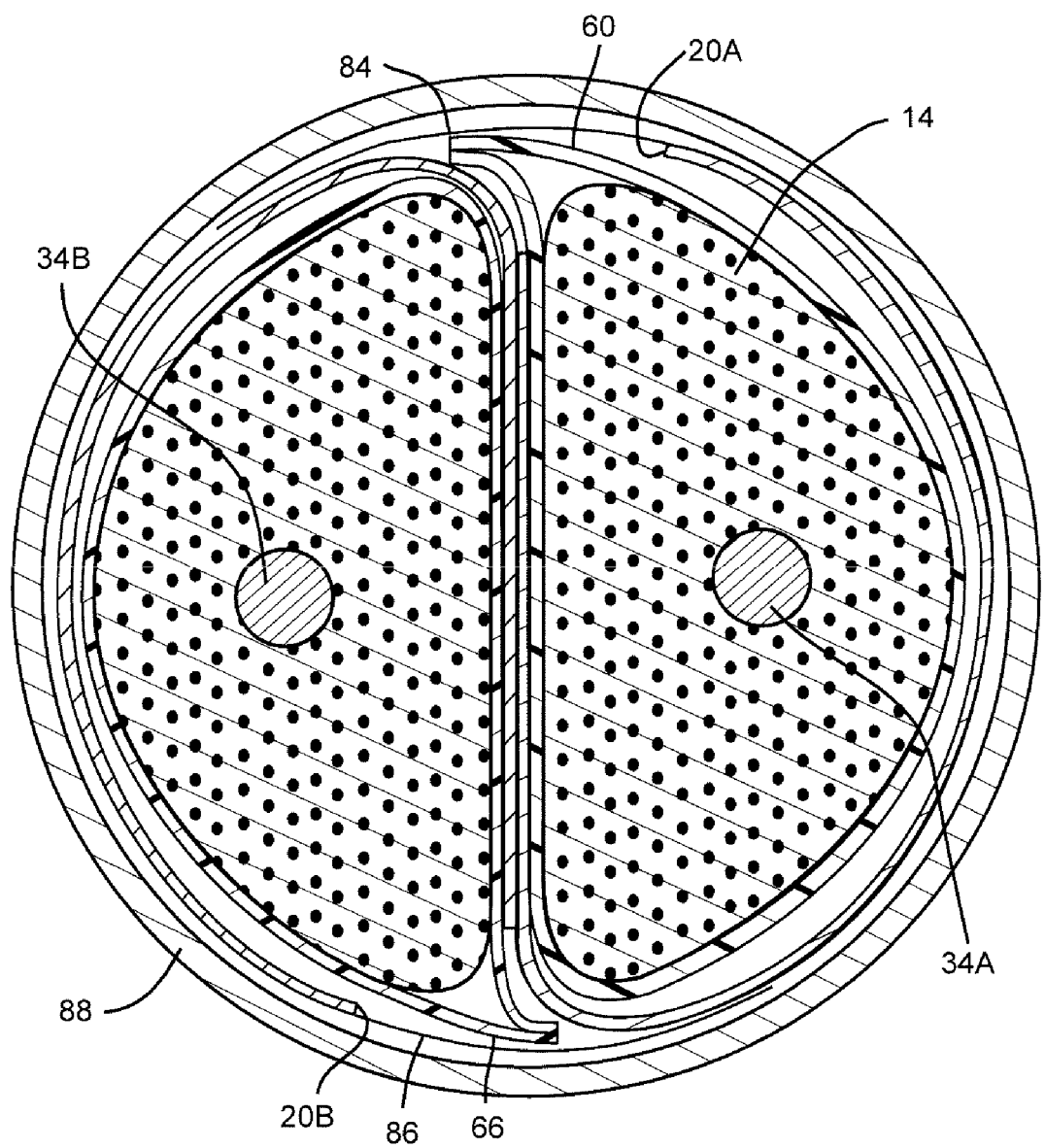
FIG. 17 is a cross-sectional view along line 17—17 of FIG. 16.
Figure 18:
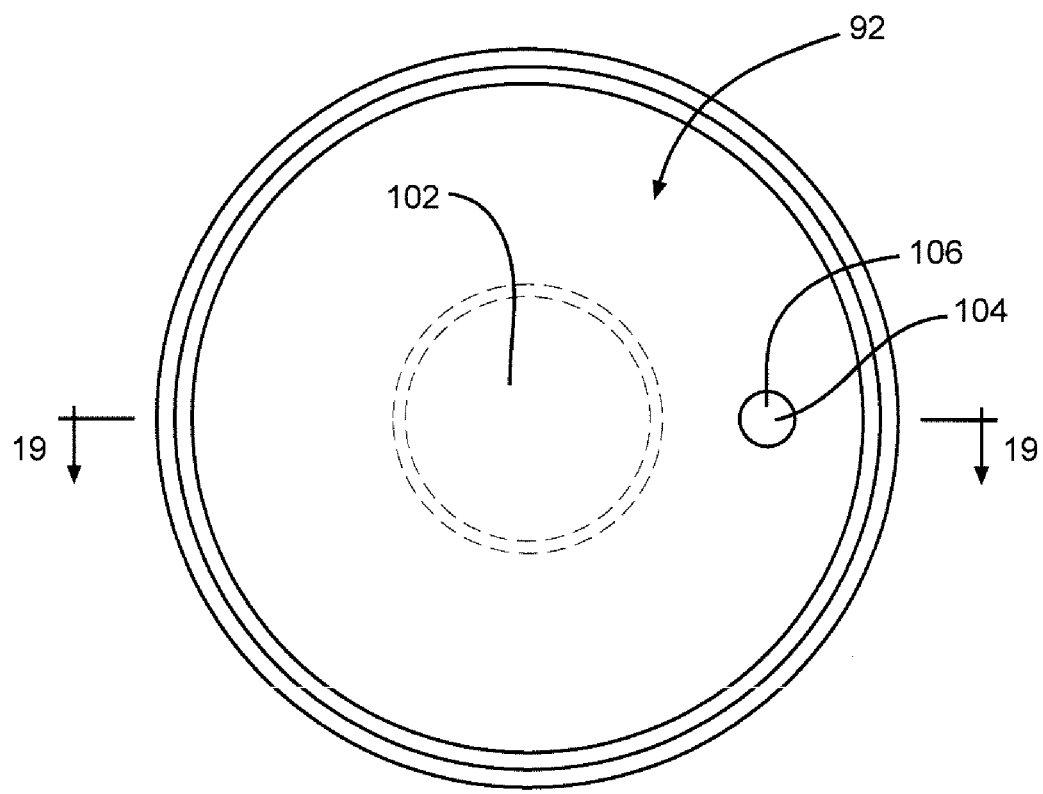
FIG. 18 is a plan view of a lower lid 94 for the casing tube 92.

As shown in FIGS. 15 to 17, the thusly-constructed electrode assembly including the header 40 is next fitted to a casing tube 88. The casing tube 88 is a cylindrically shaped member that is open at both of its ends and made of the same metal as the header 40, for example titanium. With the electrode assembly housed therein, the upper open-end 88A of the tube fits into the outer step 50 of the header. Laser welding then hermetically seals the tube 88 to the header 40 at this junction.

As shown in FIG. 16, the lower ends of the anode pellets 14, 16 and the lower edge 14 of the conductive substrate 22 comprising the associated cathode 18 are spaced from the lower open-end 88B of the tube. A lower lid 90 is fitted in the lower open end of the tube 88 to close the capacitor 10. The lower lid 90 is a unitary metal member of the same material as the header 40 and casing tube 88. It has a cylindrical shape in cross-section and comprises an upper planar surface 92 spaced from a lower planar surface 94. Between these surfaces 92, 94, the lid 90 has an outer diameter 96 leading to a step 98 that joins to a frusto-conical portion 100 tapering downwardly and inwardly to the lower surface 94. The step 98 is sized to fit into the lower open-end 88B of the tube in a snug-fitting relationship and is hermetically sealed therein, preferably by laser welding. In that manner, the header 40 closing the upper open end 88A of the tube 88 and the lower lid 90 closing the lower open end 88B form the casing 24 for the capacitor 10.

The lower lid 90 is further provided with a beveled annular recess 102 extending into the thickness thereof from the upper planar surface 92. A bore 104 extends through the thickness of the lower lid 90 and serves as an opening for filling a working electrolyte (not shown) into the casing. After the electrolyte is filled into the capacitor 10, a frusto-conically shaped plug 106 is sealed in the opening 104 by laser welding to hermetically close the casing 24.

Figure 19:
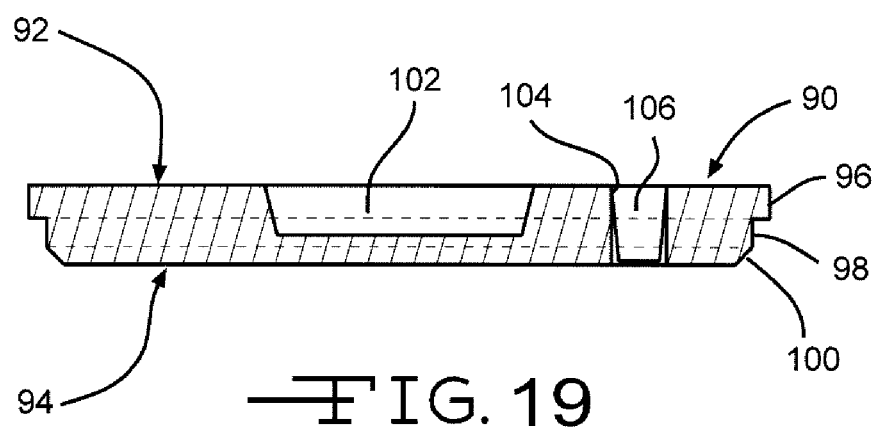
FIG. 19 is a cross-sectional view along line 19—19 of FIG. 18.
Figure 19A:
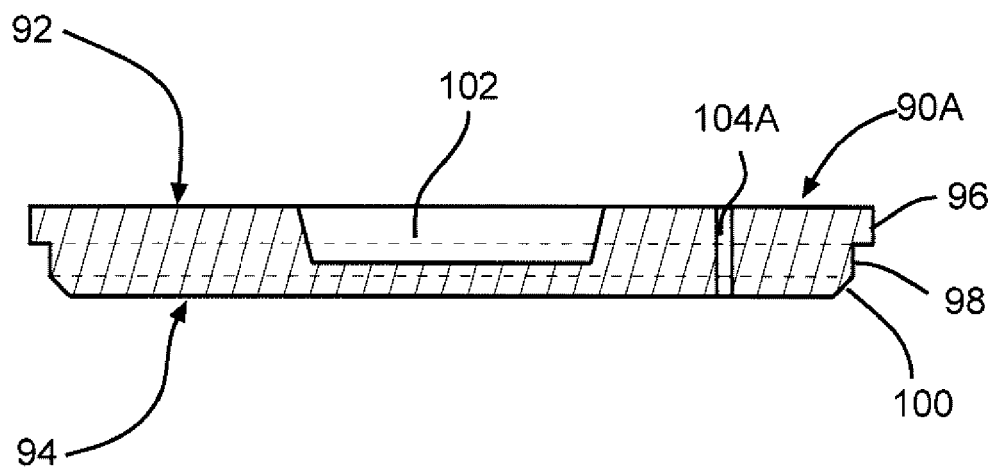
FIG. 19A is a cross-sectional view of an alternate embodiment of the lower lid 90A for the casing tube 88.
Figure 19B:
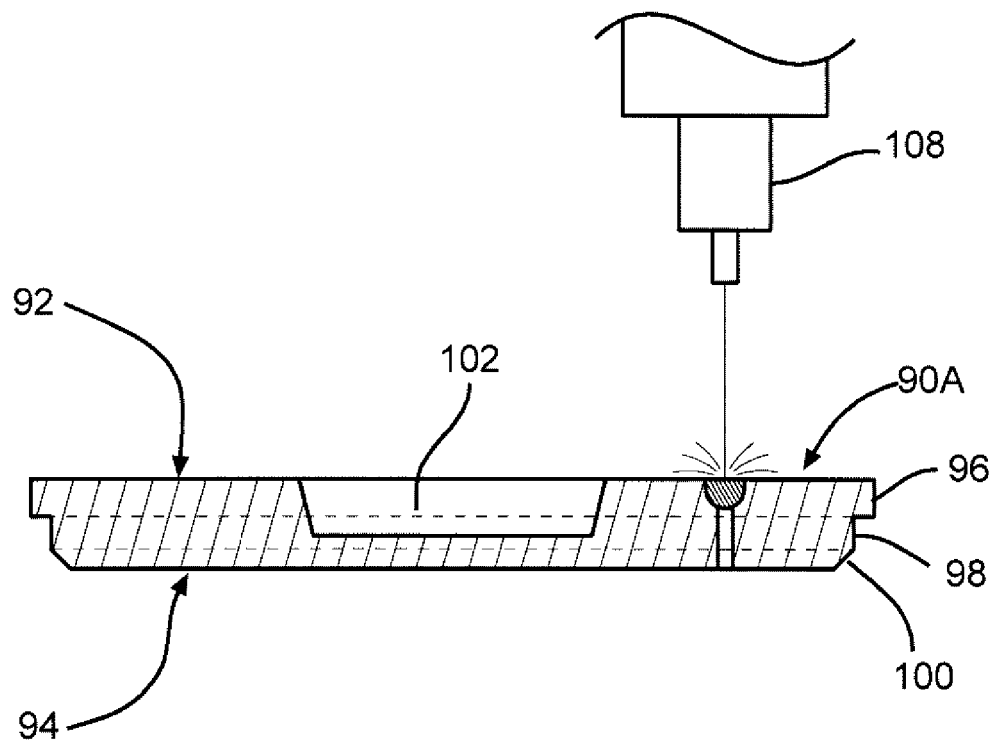
FIG. 19B is a cross-sectional view of the lower lid 90A having its electrolyte fill line 104A hermetically sealed by laser welding.

FIGS. 19A and 19B illustrate an alternate embodiment for hermetically sealing the electrolyte fill opening. In this embodiment, the lower lid 90A has a bore 104A of a diameter somewhat less than the previously described bore 104 of lid 90. Instead of welding a plug into the bore, the bore 104A is closed by heating the lid material surrounding its perimeter with a laser 108.

The capacitor 10 is completed by the provision of opposite polarity terminal connectors. If desired, a pin 110 is laser welded to the lower lid 90 and serves as the cathode terminal. This pin could be secured to any part of the header 40, casing tube 88 and lower lid 94 for this purpose. Finally, a sleeve 112 is laser welded to the distal end of the anode wire 36. The sleeve 112 makes it easier for a user of the capacitor to make this connection. The pin 110 and tube 88 are preferably secured into position by laser welding, spot welding, ultra sonic welding, and the like.

Figure 20:
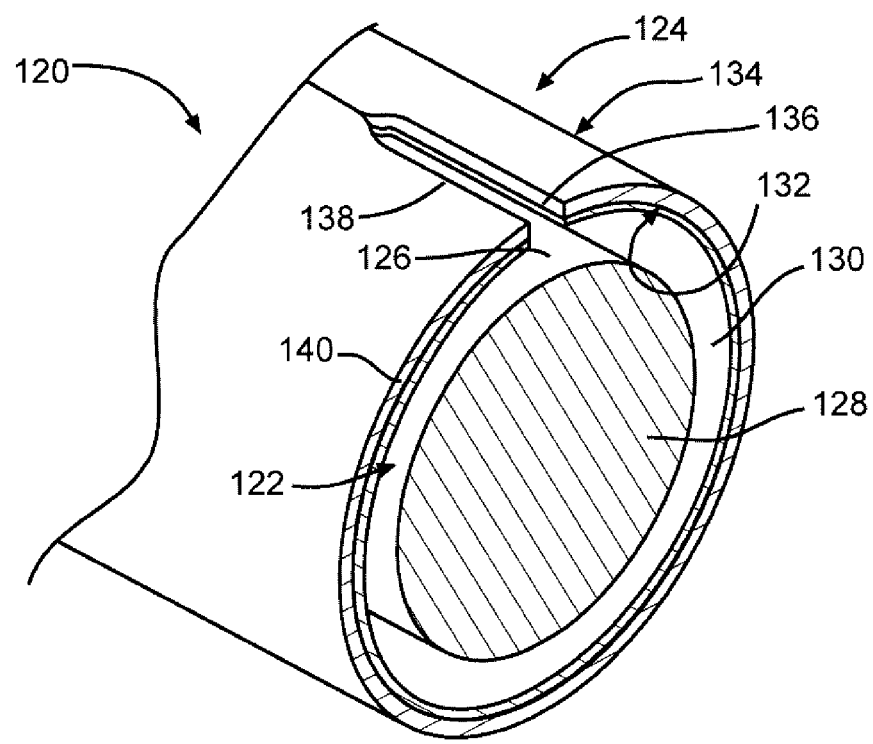
FIG. 20 is a partial isometric view of another embodiment of an electrode assembly 120 comprising a cylindrically shaped anode pellet 122 surrounded by a cathode 124 according to the present invention.

FIG. 20 shows an alternate embodiment of an electrode assembly 120 comprising a cylindrically shaped anode 122 surrounded by a cathode 124 according to the present invention. The anode 122 is of a powdered metal selected from the same groups as used to construct anode pellets 14 and 16. The anode 122 is preferably of tantalum powder compressed into a pellet having a cylindrical sidewall 126 extending to opposed planar end walls (only end wall 128 is shown in the drawing) disposed normal to the longitudinal axis of the pellet. While not shown in the drawing, an embedded wire extends from the anode, preferably from the end wall 128, for subsequent connection to the anode lead 36. As before, the anode pellet 122 is sintered under vacuum at high temperatures and then anodized in a suitable electrolyte. The anode wire is now welded to the anode lead 36 of the header 40 before a separator (not shown) of electrically insulative, but ionically conductive material is provided to completely surround and envelope the anode pellet except for the extending anode wire.

The cathode 124 comprises a conductive substrate coated with cathode active material 130 selected from the same group as used to construct cathode 18. Preferably the substrate is of titanium having opposed inner and outer major surfaces 132 and 134 extending to spaced apart right and left edges 136 and 138 meeting with an upper edge 140 and a lower edge (not shown). The cathode active material 130 is preferably ruthenium that coats or contacts the inner surface 132 in a rectangular pattern extending a relatively short distance spaced from the right and left edges 136, 138 and a relatively short distance from the upper and lower edges.

To assemble the electrode assembly 120, the cathode substrate is provided in a cylindrical shape surrounding the anode 122 with the cathode active material 130 directly opposite the anode. Laser welding secures the right and left edges 136, 138 of the substrate to each other. Although not showing in the drawing, the upper edge 140 of the substrate now abuts against the inner step 54 of the header 40 below its frusto-conical section and is secured in place by laser welding. The cathode substrate could also be welded to the case instead of to the lid. A separator (not shown) prevents direct physical contact between the anode 122 and the cathode 124. The electrode assembly 120 including the header 40 is then fitted to the casing tube 88 and the remaining steps in building the capacitor proceed as before.

Figure 21:
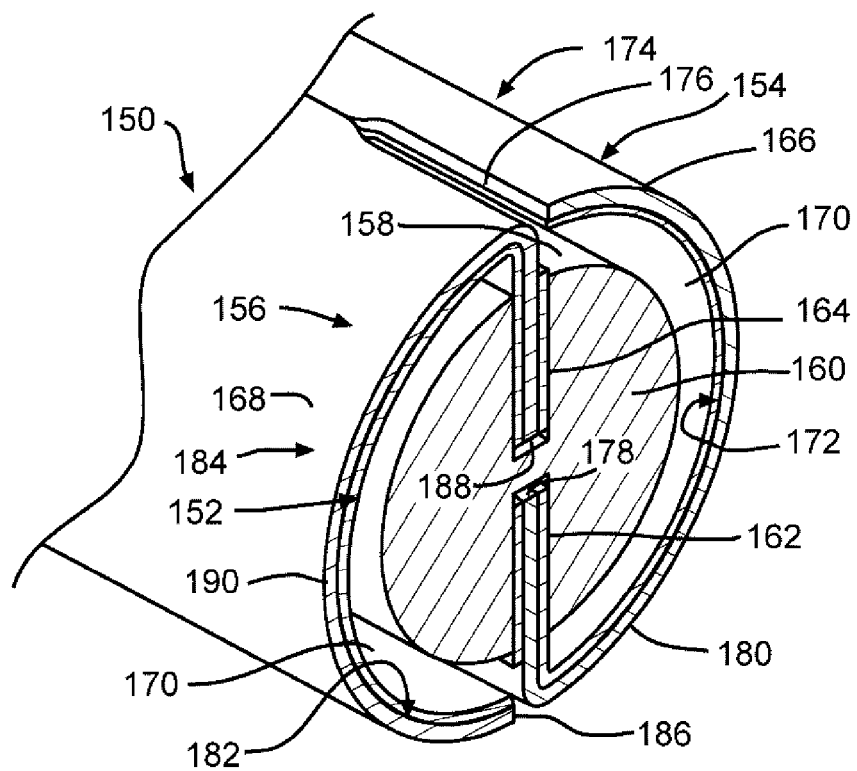
FIG. 21 is a partial isometric view of another embodiment of an electrode assembly 140 comprising a cylindrically shaped anode pellet 142 in electrical association with a pair of cathodes 144, 146.

FIG. 21 illustrates another embodiment of an electrode assembly 150 comprising a cylindrically shaped anode 152 having an H-shape in longitudinal cross-section and in electrical association with a pair of cathodes 154 and 156 according to the present invention. The anode and cathodes are of similar materials as described above. The tantalum anode pellet 152 has a cylindrical sidewall 158 extending to opposed planar end walls (only end wall 160 is shown) oriented normal to the longitudinal axis of the pellet. A pair of diametrically opposed slots 162 and 164, which are shown squared-off, but which can also be V-shaped, is formed part way into the thickness of the pellet. The slots 162, 164 extend from end wall 160 to the other end wall. An embedded wire (not shown) extends from the anode, preferably from the end wall 160, for connection to the anode lead 36. The anode pellet 152 is sintered under a vacuum at high temperature and then oxidized in a suitable electrolyte. The anode wire is next welded to the anode lead 36 of the header 40 before a separator (not shown) of electrically insulative, but ionically conductive material surrounds and envelopes the anode pellet except for the extending anode wire.

The pair of cathodes 154 and 156 comprises respective conductive substrates 166 and 168 coated with cathode active material 170. Substrate 166 comprises opposed inner and outer major surfaces 172 and 174 extending to spaced apart side edges 176 and 178 meeting with an upper edge 180 and a lower edge (not shown). Similarly, substrate 168 comprises opposed inner and outer major surfaces 182 and 184 extending to spaced apart side edges 186 and 188 meeting with an upper edge 190 and a lower edge (not shown).

The ruthenium cathode active material 170 coats or contacts the inner surface 172 of substrate 166 in a rectangular pattern extending a relatively short distance spaced from the side edges 176, 178 and a relatively short distance from the upper and lower edges. The ruthenium active material 170 also contacts the outer substrate surface 174 a relatively short distance from the side edge 178 toward side edge 186 a distance substantially equal to the depth of slot 162 in the anode pellet. The material also extends a relatively short distance from the upper and lower edges.

Similarly, the ruthenium cathode active material 170 coats or contacts the inner surface 182 of substrate 168 in a rectangular pattern extending a relatively short distance spaced from the side edges 186, 188 and a relatively short distance spaced from the upper and lower edges. The ruthenium active material also contacts the outer substrate surface 184 a relatively short distance from side edge 188 toward side edge 186 a distance substantially equal to the depth of slot 164. This active material also extends a relatively short distance from the upper and lower edges.

To assemble the electrodes assembly 150, the side edge 176 of conductive substrate 168 is moved into slot 162 until it substantially occupies this space. The cathode active material 170 on the opposed inner and outer surfaces 172, 174 is now directly opposite tantalum anode material. The substrate 166 is now curved about halfway around the circumference of the anode until the side substrate edge 186 is adjacent to the entrance to the other slot 164. Similarly, the side edge 188 of conductive substrate 168 is moved into slot 164 until it substantially occupies this space. The cathode active material 170 on the opposed inner and outer surfaces 182, 184 is directly opposite anode material. As with substrate 166, this substrate 168 is curved about halfway around the circumference of the anode pellet until its side edge 186 is adjacent to the entrances to the slot 162. The intermediate separator (not shown) prevents direct physical contact between the respective cathode active materials and the anode pellet. Although not shown in the drawing, the side edges 180, 190 of the respective substrates 166, 168 now abut against the inner step 54 of the header 40 below the frusto-conical section and are secured in place by laser welding. The electrode assembly 150 including the header 40 is then fitted to the casing tube 88 and the remaining steps in building the capacitor proceed as before.

Figures 24, 25:
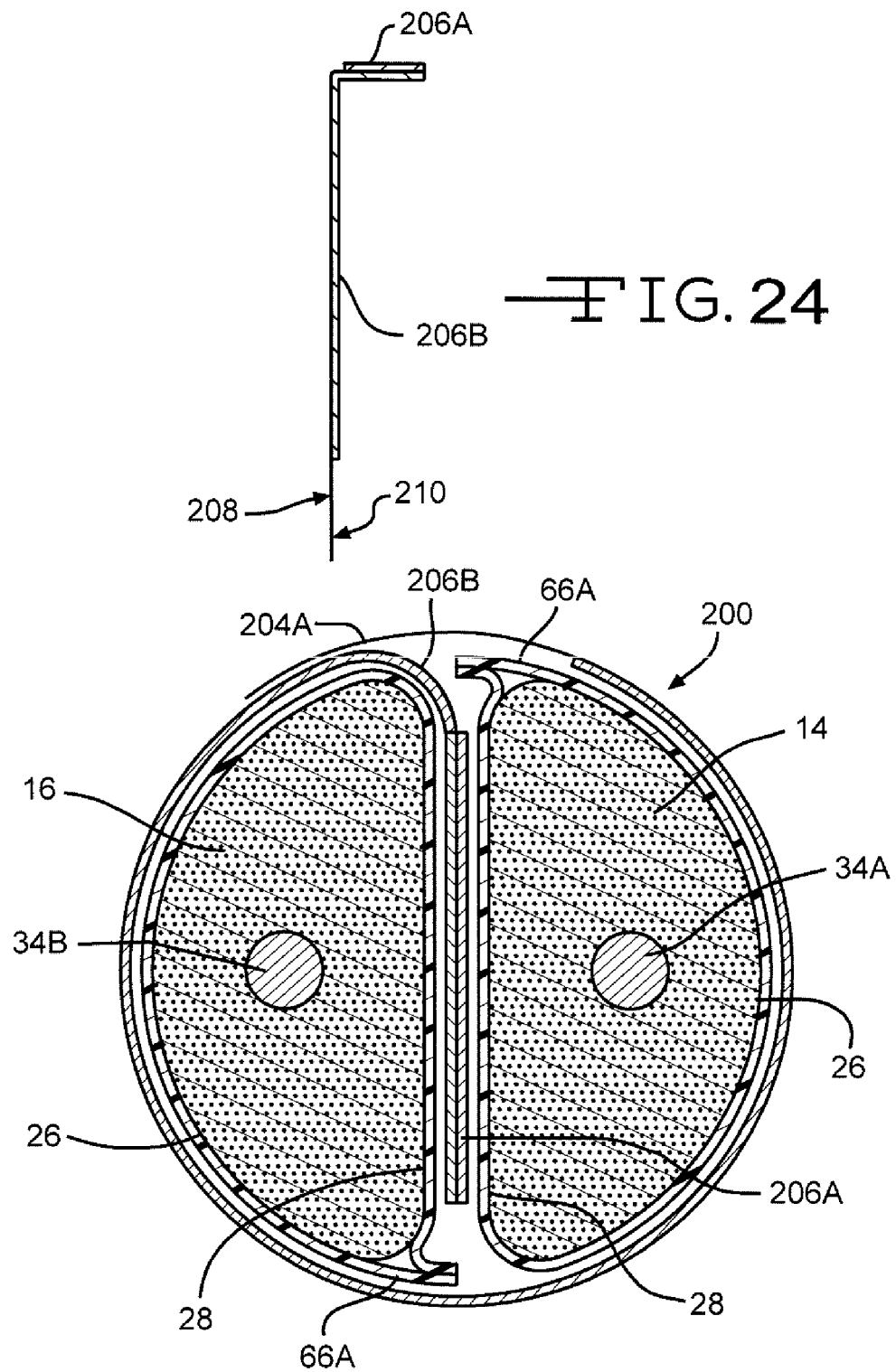
FIG. 24 is an end elevational view of the cathode 18A partially folded into its final shape.
FIG. 25 is a cross-sectional view similar to that of FIG. 14, but with the cathode 18A comprising part of the electrode assembly for the capacitor.

FIGS. 22 to 26 illustrate an alternate embodiment for constructing an electrode assembly 200. FIGS. 22 to 24 show a cathode 202 comprising a conductive substrate 204 supporting a cathode active material 206. The materials of the substrate 204 and cathode active material 206 are the same as those of the previously described for these parts or structures.

The substrate 204 comprises approved major surfaces 208 and 210 extending to spaced apart right and left edges 212 and 214 meeting with an upper edge 216 and a lower edge 218. A cut out 220 is provided at the junction of the right edge 212 and the upper edge 216. Another cut-out 222 is provided at the junction of the right edge 212 and the lower edge 218. The upper cut-out 220 is somewhat larger than the lower cut-out 222.

The cathode active material 206 coats or contacts the conductive substrate 204 at selected locations. A first section 206A of cathode active material is contacted to the first major surface 208 of the substrate in a rectangular pattern in plan view extending from the right edge 212 toward the aligned vertical edges of the cut-outs 220, 222, but spaced therefrom. A second section 206B of cathode active material is contacted to the second major surface 210 of the substrate in a generally rectangular pattern in plan view extending from the right edge 212 toward the left edge 214, but spaced therefrom. The second cathode active section 206B has upper and lower edges that are parallel to the upper and lower substrate edges 216, 218 and spaced therefrom. In addition to forming tab 224 and lower edge 226, this configuration forms a left uncoated portion 204A of the substrate extending from the left edge of the second active material 206B to the left substrate edge 214. As showing in FIG. 23, this provides the first and second cathode active sections 206A, 206B having portions aligned in an overlaying relationship with each other on the respective major substrate surfaces 208, 210 extending from the right substrate edge 212 toward the aligned vertical edges of the cut-outs 220, 222, but spaced therefrom. The previously described pad printing and ultrasonic spraying process are preferred for contacting the cathode active material 206 to the substrate 204.

To assemble the anode assembly 12 with the cathode 202, the conductive substrate 204 is folded along the aligned right edge of the cut-outs 220, 222 into a generally L-shaped configuration (FIG. 24). Preferably, a very small gap (not shown) is left in the coated section 206B along the fold line. This prevents the cathode active material from flaking or sloughing off of the conductive substrate as it is folded. The aligned portions of the active sections 206A, 206B at the second leg of the L-shape is next aligned with the gap between the distal end walls 32 of the anode pellets 14, 16. The substrate 204 is then moved along this gap until the upper edges of the cathode active material sections 206A, 206B at the inlet 220 are aligned with the upper end walls 30 of the anode pellets 14, 16.

The substrate 204 is now bent into a curved shape mirroring that of the semi-circular sidewalls 26 of the anode pellets 14, 16. The uncoated portion 204A is of a length that is sufficient to overlap a portion of the substrate adjacent to where the long leg of the L meets the short leg (FIG. 25) to form a closed, surrounding construction. In particular, the uncoated portion 204A overlaps the substrate opposite the side supporting the second coated section 206B.

As shown in FIG. 25, the first cathode active material section 206A now "covers" in an opposing manner the planar sidewall 28 of anode pellet 14 while the second cathode active material section 206B covers the semi-circular sidewall 26 and the planar sidewall 28 of anode pellet 16. Intermediate separators 66A prevents direct physical contact between the cathode active material sections and the anode pellets. The tab 224 abuts against the inner step 54 of the header 40 below the frusto-conical section 52, and is secured in place by laser welding. The lower edge of the cathode active material adjacent to the lower substrate edge 226 is now aligned with the lower end walls 32 of the anode pellets.

Figure 26:
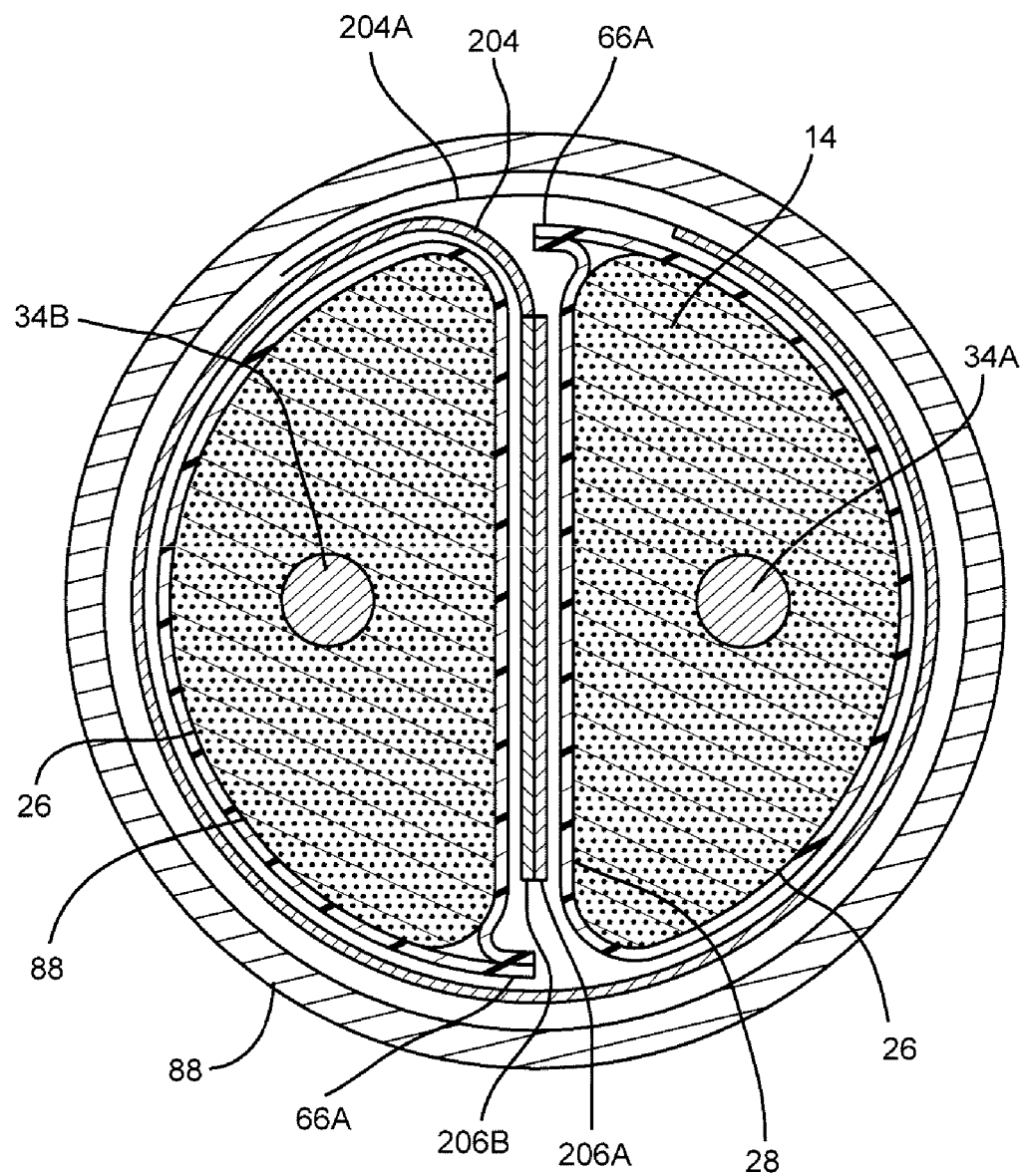
FIG. 26 is a cross-sectional view showing the electrode assembly of FIG. 25 housed inside the casing tube 88.

As shown in FIG. 26, the thusly-constructed electrode assembly including the header 40 (not shown in this figure) is fitted to the casing tube 88 which are hermetically sealed together as previously discussed with respect to FIGS. 15 to 17. The remaining steps in constructing the capacitor including introducing the electrolyte therein and hermetically sealing the capacitor proceed as previously described.

It is appreciated that various modifications to the inventive concepts described herein may be apparent to those of ordinary skill in the art without departing from the spirit and scope of the present invention as defined by the appended claims.

What is claimed is:

1. A capacitor, which comprises:
   a) a casing having a cylindrical casing sidewall extending to closed first and second end walls;
   b) at least one anode comprising a radiused anode sidewall extending to first and second anode end walls;
   c) a cathode comprising at least one conductive substrate having first and second major faces, at least one of which supports a cathode active material, wherein the conductive substrate curves around the anode sidewall, but is prevented from contact therewith by an intermediate separator to thereby form an electrode assembly housed inside the casing;
   d) a working electrolyte contained inside the casing;
   e) wherein the anode is connected to an anode terminal electrically isolated from a cathode terminal; and
   f) wherein the casing is hermetically sealed by one of an electrolyte fill opening provided with a plug sealed to the casing sidewall or with an electrolyte fill opening through the casing sidewall having the sidewall fused to itself.

2. The capacitor of claim 1 wherein the first and second anode end walls are planar and parallel to each other.

3. The capacitor of claim 1 wherein the anode is cylindrically shaped and wherein the conductive substrate comprises upper and lower edges extending to first and second side edges contacting each other such that the conductive substrate curves around the perimeter of the anode sidewall in a surrounding relationship.

4. The capacitor of claim 3 wherein in the surrounding relationship, the upper and lower edges of the conductive substrate are positioned adjacent to the first and second anode end walls.

5. The capacitor of claim 1 wherein an anode wire supported by the anode connects to a terminal lead supported in a glass-to-metal seal in a header closing the first casing end wall to electrically isolate the terminal lead from the casing serving as the cathode terminal.

6. A capacitor, which comprises:
   a) a casing having a cylindrical casing sidewall extending to closed opposed first and second end walls;
   b) a first anode and a second anode, each comprising a radiused anode sidewall meeting a planar sidewall portion extending to first and second anode end walls, wherein the anodes are in a side-by-side relationship having the respective planar sidewall portions facing each other;
   c) a cathode comprising a conductive substrate having first and second major faces supporting a cathode active material and extending to spaced apart first and second side edges meeting with upper and lower edges, wherein a middle portion of the conductive substrate has the cathode active material supported on both the first and second major faces thereof and is positioned between the facing planar anode sidewall portions with the remaining portions of the conductive substrate curving around the first and second anode sidewalls in opposite directions with the first and second side edges each meeting the conductive substrate adjacent to the middle portion thereof and wherein the curving portions of the conductive substrate support the cathode active material on the major face facing the respective anode sidewalls to thereby provide an electrode assembly housed inside the casing;
   d) a separator positioned between the side-by-side anodes and the cathode to prevent them from contacting each other;
   e) a working electrolyte contained inside the casing; and
   f) wherein each of the first and second anodes is connected to an anode terminal electrically isolated from a cathode terminal.

7. The capacitor of claim 6 wherein an anode wire supported by each of the first and second anodes connects to a terminal lead supported in a glass-to-metal seal in a header closing the first casing end wall to electrically isolate the terminal lead from the casing serving as the cathode terminal.

8. The capacitor of claim 6 wherein a polymeric material encases the connection between the terminal lead and the anode wires.

9. The capacitor of claim 6 wherein the anode is of a powdered metal selected from the group consisting of tantalum, aluminum, titanium, niobium, zirconium, hafnium, tungsten, molybdenum, vanadium, silicon, germanium, and mixtures thereof and the cathode active material is selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead gold, silver, cobalt, carbon nanotubes, amorphous carbon graphite, carbon black, and mixtures thereof contacted to the conductive substrate selected from titanium, tantalum, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof.

10. A method for providing a capacitor, comprising the steps of:
   a) providing a casing having a cylindrical casing sidewall extending to closed first and second end walls;
   b) providing at least one anode comprising a radiused anode sidewall extending to first and second anode end walls;
   c) providing a cathode comprising at least one conductive substrate having first and second major faces, at least one of which supports a cathode active material, wherein the conductive substrate curves around the anode sidewall, but is prevented from contact therewith by an intermediate separator to thereby form an electrode assembly housed inside the casing;
   d) filling a working electrolyte inside the casing;
   e) connecting the anode to an anode terminal electrically isolated from a cathode terminal; and
   f) hermetically sealing the casing by one of an electrolyte fill opening provided with a plug sealed to the casing sidewall or with an electrolyte fill opening through the casing sidewall having the sidewall fused to itself.

11. The method of claim 10 including providing the first and second anode end walls being planar and parallel to each other.

12. The method of claim 10 including providing the anode as cylindrically shaped and further providing the conductive substrate comprising upper and lower edges extending to first and second side edges contacting each other with the conductive substrate curving around the perimeter of the anode sidewall in a surrounding relationship.

13. The method of claim 12 including positioning the upper and lower edges of the conductive substrate adjacent to the first and second anode end walls.

14. The method of claim 10 including forming at least two slots in the anode sidewall and providing the cathode comprising first and second conductive substrates, each having first and second major faces extending to spaced apart first and second side edges meeting with upper and lower edges with a cathode active material supported on at least the first major faces thereof, and positioning a first side edge of each conductive substrate in one of the respective slots with the remaining portion of the substrates curving around the anode sidewall in opposite directions with the second side edges meeting the other conductive substrate adjacent to its slot to thereby provide the electrode assembly.

15. The method of claim 14 including providing the slots being diametrically opposed to each other and extending to the first and second anode end walls to provide the anode having an H-shape in longitudinal cross-section.

16. The method of claim 15 including providing that portion of each conductive substrate residing in the respective slots with cathode active material on both the first and second major faces thereof.

17. The method of claim 14 including providing an anode wire supported by the anode connected to a terminal lead supported in a glass-to-metal seal in a header closing the first casing end wall to electrically isolate the terminal lead from the casing serving as the cathode terminal.

18. The method of claim 14 including providing the anode comprising first and second anodes, each comprising a radiused anode sidewall meeting a planar sidewall portion extending to first and second anode end walls, and including positioning the anodes, in a side-by-side relationship having the respective planar sidewall portions facing each other with a middle portion of the conductive substrate having the cathode active material supported on both the first and second major faces thereof and positioned between the facing planar anode sidewall portions with the remaining portions of the conductive substrate curving around the first and second anode sidewalls in opposite directions with the first and second side edges each meeting adjacent to the middle portion of the conductive substrate and supporting the cathode active material on the major face of the curving portions of the conductive substrate facing the respective anode sidewalls to thereby provide an electrode assembly housed inside the casing.

19. The method of claim 14 including providing the anode comprising first and second anodes, each comprising a radiused anode sidewall meeting a planar sidewall portion extending to first and second anode end walls, and including positioning the anodes, in a side-by-side relationship having the respective planar sidewall portions facing each other with a first portion of the conductive substrate adjacent to a fist side edge having the cathode active material supported on both the first and second major faces thereof and positioned between the facing planar anode sidewall portions with the remaining portion of the conductive substrate curving around the first and then the second anode sidewalls with a second substrate side edge meeting the conductive substrate adjacent to first substrate portion and supporting the cathode active material on the major face of the curving portion of the conductive substrate facing the respective anode sidewalls to thereby provide an electrode assembly housed inside the casing.

20. A capacitor, which comprises:
   a) a casing having a casing sidewall extending to closed first and second end walls;
   b) an anode comprising a radiused anode sidewall extending to first and second anode end walls with at least two slots formed into the anode sidewall;
   c) a cathode comprising first and second conductive substrates, each having first and second major faces extending to spaced apart first and second side edges meeting with upper and lower edges with a cathode active material supported on at least the first major faces thereof, wherein a first side edge of each conductive substrate resides in one of the respective slots with the remaining portion of the substrates curving around the anode sidewall in opposite directions with the second side edges meeting the other conductive substrate adjacent to its slot, wherein the conductive substrates curving around the anode sidewall are prevented from contact with the anode by an intermediate separator to thereby form an electrode assembly housed inside the casing;

d) a working electrolyte contained inside the casing; and e) wherein the anode is connected to an anode terminal electrically isolated from a cathode terminal.

21. The capacitor of claim 20 wherein the slots are diametrically opposed to each other and they extend to the first and second anode end walls to provide the anode having an H-shape in longitudinal cross-section.

22. The capacitor of claim 20 wherein that portion of each conductive substrate residing in the respective slots has cathode active material on both the first and second major faces.

23. The capacitor of claim 20 wherein the casing is hermetically sealed with an electrolyte fill opening provided with a plug sealed to the casing sidewall.

24. The capacitor of claim 20 wherein the casing is hermetically sealed with an electrolyte fill opening through the casing sidewall having the casing sidewall fused to itself.

25. A capacitor, which comprises:

a) a casing having a casing sidewall extending to closed first and second end walls;

b) anode comprises first and second anodes, each comprising a radiused anode sidewall meeting a planar sidewall portion extending to first and second anode end walls, wherein the anodes are in a side-by-side relationship having the respective planar sidewall portions facing each other;

c) a cathode comprising a conductive substrate having first and second major faces, wherein a middle portion of the conductive substrate has cathode active material supported on both the first and second major faces thereof and is positioned between the facing planar anode sidewall portions with the remaining portions of the conductive substrate curving around the first and second anode sidewalls in opposite directions with the first and second side edges each meeting adjacent to the middle portion of the conductive substrate and wherein the curving portions of the conductive substrate support the cathode active material on the major face facing the respective anode sidewalls and being prevented from contact with the anode by an intermediate separator to thereby form an electrode assembly housed inside the casing;

d) a working electrolyte contained inside the casing; and e) wherein the anode is connected to an anode terminal electrically isolated from a cathode terminal.

26. A capacitor, which comprises:

a) a casing having a casing sidewall extending to closed first and second end walls;

b) an anode comprises first and second anodes, each comprising a radiused anode sidewall meeting a planar sidewall portion extending to first and second anode end walls, wherein the anodes are in a side-by-side relationship having the respective planar sidewall portions facing each other;

c) a cathode comprising a conductive substrate having first and second major faces, wherein a first portion of the conductive substrate adjacent to a first side edge has the cathode active material supported on both the first and second major faces thereof and is positioned between the facing planar anode sidewall portions with the remaining portion of the conductive substrate curving around the first then the second anode sidewalls with a second substrate side edge meeting the conductive substrate adjacent to the first portion thereof and wherein the curving portion of the conductive substrate supports the cathode active material on the major face facing the respective anode sidewalls and is prevented from contact with the anode by an intermediate separator to thereby form an electrode assembly housed inside the casing;

d) a working electrolyte contained inside the casing; and e) wherein the anode is connected to an anode terminal electrically isolated from a cathode terminal.

* * * * *

UNITED STATES PATENT AND TRADEMARK OFFICE
CERTIFICATE OF CORRECTION

PATENT NO.        : 7,072,171 B1
APPLICATION NO.   : 11/307564
DATED             : July 4, 2006
INVENTOR(S)       : Muffoleto et al.

Page 1 of 1

It is certified that error appears in the above-identified patent and that said Letters Patent is hereby corrected as shown below:

TITLE Pg. ITEM (75)
Inventors:  delete "Chris Ziarniac" and insert --Chris Ziarniak-- delete "Eric Ziarniac" and insert --Eric Ziarniak--

Signed and Sealed this

Third Day of October, 2006

JON W. DUDAS
*Director of the United States Patent and Trademark Office*